Jan. 21, 1969

W. B. WHITE 3,423,151

OPTICAL PRISMATIC LENSES DETACHABLY
MOUNTED ON SPECTACLE TEMPLE PIECES

Filed May 17, 1965

INVENTOR.
WALTER BOYD WHITE
BY
John E. Reilly
ATTORNEY

United States Patent Office 3,423,151
Patented Jan. 21, 1969

3,423,151
OPTICAL PRISMATIC LENSES DETACHABLY MOUNTED ON SPECTACLE TEMPLE PIECES
Walter Boyd White, 9100 W. 44th Ave., Wheatridge, Colo. 80033
Filed May 17, 1965, Ser. No. 456,116
U.S. Cl. 351—175                              2 Claims
Int. Cl. G02c 7/02

ABSTRACT OF THE DISCLOSURE

Optical prismatic lenses are detachably mounted to spectacle temple pieces in close relation to the rear of the main lenses to provide the wearer with a wider field of vision.

This invention relates to novel and improved optical devices, and more particularly relates to optical prismatic lenses being adapted for attachment to spectacle frames to increase the lateral field of the vision.

In cataract operations the lens is removed from the eye, and since the eye loses its ability to focus it is necessary for the cataract patient to wear spectacles or eyeglasses which will effectively perform this function. Even so, the cataract patient is not capable of focusing on objects outside the field of the spectacle lenses so that his field of vision is greatly restricted. Accordingly, it is a principal and foremost object of the present invention to provide an optical prismatic lens device being especially adapted for use by cataract patients which will appreciably extend their lateral or peripheral field of vision.

It is another object of the present invention to provide for optical prismatic lenses being adaptable for attachment to a spectacle frame and being accurately adjustable to cooperate with the main lenses in extending the lateral field of vision as well as paralleling the lateral light rays of the main lenses.

It is a further object of the present invention to provide an optical prismatic lens device for detachable connection to spectacles and the like, the lens device being arranged in normal relation to the main lens and having a prescription corresponding to that of the main lens; further, wherein the lens device is attached in such a way as not to interfere with normal use of the spectacles, and is inconspicuous so as not to detract from the appearance of the spectacles.

The above and other objects, advantages and features of the present invention will become more readily understood and appreciated from a consideration of the following detailed description of a preferred form of invention when taken together with the accompanying drawings, in which.

Figure 1:
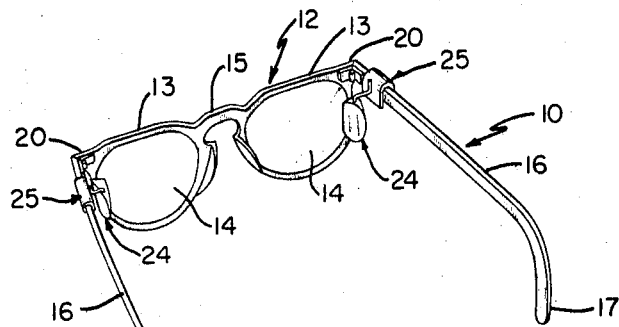
FIGURE 1 is a perspective view of a preferred form of the present invention illustrated in connected relation to a pair of spectacles.
Figure 5:
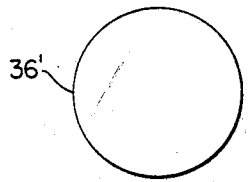
FIGURES 5 and 6 are elevational and plan views of a modified form of the present invention.
Figure 6:
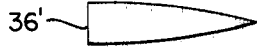

Referring in detail to the drawings, there is shown by way of illustrative example in FIGURE 1 a pair of spectacles 10 which in accordance with conventional practice is comprised of a frame 12 having lens holders 13 to support main lenses 14 and the holders 13 being interconnected by a central nose piece 15. Temple bars 16 having suitable ear pieces 17 are hinged at their forward ends to outer lateral end portions 20 of the holders for rearward extension therefrom. In accordance with the present invention, a pair of optical prismatic lenses 24 include connecting members 25 for removably attaching the lenses 24 to the spectacle frame and in substantially perpendicular relation to each of the main lenses for the purpose of extending the lateral vision of the wearer. In this relation, the prismatic lenses 24 of the present invention are specifically designed for use by cataract patients where all focusing must be accomplished by the spectacle lenses; and accordingly, the main lenses are individually ground to prescription for each patient. Since the optical prismatic lenses 24 are desirably formed to increase or extend the field of vision, they are similarly ground to prescription approximating that of the main lenses in order to bring objects into proper focus which are outside the field of vision of the main lenses.

In grinding the main lenses 14 to prescription, customarily each lens will have an outer, generally convex light entrance surface 30 and an inner generally concave light exit surface 32 in refracting light rays passing through the lens onto the eye. This is illustrated generally in FIGURE 4 wherein it will be noted that a light ray R enters the lens and is bent generally in the direction indicated by R' then is bent to an even greater angle as indicated by the ray R" in passing through the light exit face; and of course each light ray is bent along an increasing or decreasing angle according to the location of its passage through the lens for proper focusing on the eye. Again each prismatic lens 24 is ground to correspond to the prescription of the main lens and essentially is comprised of a light entrance face 34 and a light exit face 35 converging away from peripheral edge surface 36. The connecting member 25 is defined by a wire 38 of limited flexibility having one end 39 inserted a limited distance through the upper edge of the lens and is embedded therein, and the opposite end is affixed to a generally U-shaped clip 40 for clamping engagement with a temple bar 16. It will be noted that the clip member 40 is connected to the temple bar adjacent to the end portion 20 and in such a way that the lens 24 is positioned to extend rearwardly from the outside lateral edge of the lens holders 13 in substantially perpendicular relation to the main lens 14. In this relation, the edge 36 is disposed adjacent to the holder 14 with the principal faces 34 and 35 converging rearwardly at an included angle such that the light rays passing through the supplementary lenses 24 are refracted to converge with the light rays through the main lens; or in other words, the lens 24 will effectively form a continuation of the main lens for proper focusing of objects which would otherwise be outside the field of vision.

Figure 2:
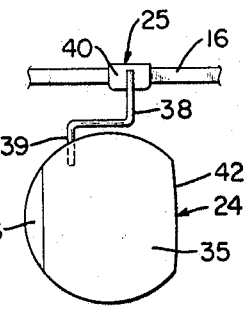
FIGURE 2 is an enlarged elevational view of the preferred form of invention shown in FIGURE 1.

In forming each prismatic lens 24, it is highly desirable that the lens be compact and as inconspicuous as possible in mounted relation upon the spectacle frame so as not to detract in any way from the appearance of the spectacle frame. In forming and grinding the lens to perscription, preferably the body of the lens is of generally circular configuration and for instance may be cut from a Plexiglas rod with the principal faces 34 and 35 being cut at a relatively low included angle to one another transversely across the rod. Here it will be noted that the lens is relatively shallow and the principal faces are convergent away from the relatively thick edge surface 36 to virtually intersect one another at the diametrically opposed edge surface 42. In the form shown in FIGURES 2 and 3, preferably the front edge surface 36 may be vertically cut at an oblique angle and the rearward edge surface 42 similarly may be cut vertically to eliminate the sharp edge formed by intersection of the principal faces 34 and 35. Or, as shown in the modified form in FIG- URES 5 and 6, the peripheral edge surface 36' may simply be left rounded and be entirely suitable for its intended purpose. A further advantage in forming an oblique edge surface 36, however, is that the lens may be positioned closely adjacent to the lens holder portion and eliminate possible double lens action.

Figure 3:
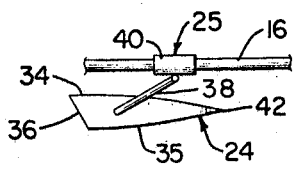
FIGURE 3 is a plan view of the preferred form of invention.
Figure 4:
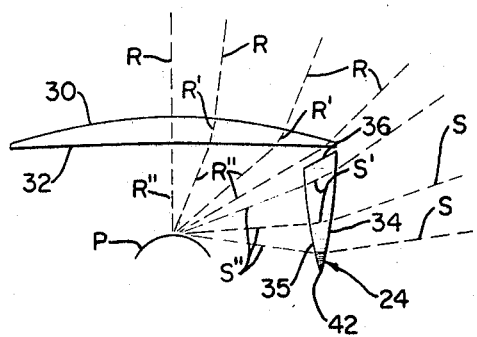
FIGURE 4 is a diagrammatic view of the relative disposition between the prismatic lens of the present invention, the main lens, and the eye.

In the preferred form of invention, and with particular reference to FIGURES 3 and 4, it will be seen that the light entrance and exit faces 34 and 35 both are ground to present external convex surfaces, as opposed to the concavo-convex surfaces of the main lens, and preferably each surface is ground to define approximately one-half the prescription of the main lens so as to be additive to correspond with the prescription of the main lens for proper focusing and convergence of the light rays toward the eye. Thus a light ray S passing through the lens 24 will be refracted in one direction S' through the entrance face 34 and is then refracted in the direction S" from exit face 35 for convergence with the rays R" through the main lens, again as best seen from FIGURE 4.

In use, and again referring to FIGURE 1, it will be seen that a pair of prismatic lenses 24 are disposed in connected relation to the temple bars with the lenses 24 extending rearwardly from the outer lateral edges of the lens holders just forwardly of the eye P. Once attached, the wearer may accurately adjust the lenses by a slight bending of the connecting wires about the clips until the lenses are properly focused and positioned in desired relation to the main lenses. In this connection it will be evident that the prismatic lenses 24 may be connected by other suitable means to the spectacle frame; or if desired may be attached directly to the lens holders; or further may be built into the spectacle frames and again the important relation being disposition of the lenses for rearward extension in substantially perpendicular relation to the main lenses. Of course in providing for removable attachment of the lenses they can be easily removed when not required or for cleaning purposes.

It is therefore to be understood from the foregoing that while there has been shown and described preferred embodiments of the present invention, various modifications and changes may be made in the size, composition and arrangement of parts according to their intended use and application without departing from the spirit and scope thereof as defined by the appended claims.

What is claimed is:
1. In spectacles having a spectacle frame provided with a pair of main lenses and a pair of temple bars extending rearwardly from the spectacle frame, a pair of optical prismatic lenses each of generally circular configuration having generally convex principal light entrance and exit faces converging rearwardly from a front peripheral edge surface into intersecting relation to one another and each having a prescription corresponding substantially to that of the main lenses, and each of said prismatic lenses including a connecting member removably attaching each of said prismatic lenses to said spectacle frame with each of said prismatic lenses extending rearwardly from and perpendicular to the outer lateral edge of each of the respective main lenses in spaced relation to and inwardly of said temple bars, and each prismatic lens being disposed in a position in which the front peripheral edge surface is in direct proximity to the main lens and the principal light entrance and exit faces are convergent rearwardly from the lateral edge of each of the respective main lenses, the light entrance and light exit faces being aligned with respect to said main lenses and with respect to one another to define a continuation of each main lens for uninterrupted focusing and convergence of the light rays on the eye.

2. In spectacles according to claim 1, each of said connecting members being defined by a flexible connecting wire embedded at one end in the body of said prismatic lens and a generally U-shaped clip at the opposite end of said connecting wire for removable attachment to said temple bar with each prismatic lens depending downwardly from attachment to said temple bar.

References Cited
UNITED STATES PATENTS

| | | | |
|---|---|---|---|
| 439,130 | 10/1890 | Edmunds | 351—175 X |
| 767,617 | 8/1904 | Wells | 351—57 |
| 1,206,457 | 11/1916 | Mills | 351—57 |
| 2,058,969 | 10/1936 | Fishman | 351—41 |
| 3,266,111 | 8/1966 | Abel. | |

FOREIGN PATENTS

| | | |
|---|---|---|
| 706,893 | 4/1931 | France. |
| 988,992 | 5/1951 | France. |
| 1,025,162 | 1/1953 | France. |

DAVID SCHONBERG, *Primary Examiner.*

W. L. BROWN, *Assistant Examiner.*

U.S. Cl. X.R.

351—57